United States Patent

Ishida et al.

Patent Number: 5,164,259
Date of Patent: Nov. 17, 1992

[54] MAGNETIC RECORDING MEDIUM HAVING A SPECIFIED FATTY ACID HYDROXYLALUMINUM SALT AS A LUBRICANT CONTAINED IN OR ON THE MAGNETIC LAYER

[75] Inventors: Toshio Ishida; Yasuo Nishikawa; Akira Ushimaru, all of Kanagawa, Japan

[73] Assignee: Fuji Photo Film Co., Ltd., Kanagawa, Japan

[21] Appl. No.: 682,272

[22] Filed: Apr. 9, 1991

[30] Foreign Application Priority Data

Apr. 9, 1990 [JP] Japan .................................. 2-92035

[51] Int. Cl.$^5$ ................................................ G11B 5/00
[52] U.S. Cl. ........................................ 428/323; 428/336; 428/694; 428/695; 428/900
[58] Field of Search ............... 252/62.54, 35; 428/694, 428/695, 900, 336, 323

[56] References Cited

U.S. PATENT DOCUMENTS

| | | | |
|---|---|---|---|
| 2,751,359 | 6/1956 | Hill et al. | 252/35 |
| 2,932,659 | 4/1960 | Orthner | 252/35 |
| 4,087,582 | 5/1978 | Shirahata et al. | 428/333 |
| 4,678,705 | 7/1987 | Huisman et al. | 428/315.9 |

*Primary Examiner*—Paul J. Thibodeau
*Assistant Examiner*—Stevan A. Resan
*Attorney, Agent, or Firm*—Sughrue, Mion, Zinn, Macpeak & Seas

[57] ABSTRACT

A magnetic recording medium comprising a non-magnetic support having a magnetic layer provided thereon, wherein a higher fatty acid hydroxylaluminum salt represented by formula (I) is provided in or on the magnetic layer:

$$(R^1COO)_n Al(OH)_{3-n}$$

wherein $R^1$ is a hydrocarbon group having from 10 to 26, and n is an integer of 1 or 2. The magnetic recording medium has a low coefficient of friction and good running durability even when used or stored under high-temperature and high humidity conditions.

16 Claims, No Drawings

MAGNETIC RECORDING MEDIUM HAVING A SPECIFIED FATTY ACID HYDROXYLALUMINUM SALT AS A LUBRICANT CONTAINED IN OR ON THE MAGNETIC LAYER

FIELD OF THE INVENTION

The present invention relates to a magnetic recording medium comprising a non-magnetic support having provided thereon a magnetic layer. More specifically, the present invention is concerned with a magnetic recording medium for high density recording having a decreased coefficient of friction under wide temperature and humidity conditions, excellent running properties and durability.

BACKGROUND OF THE INVENTION

In a magnetic recording medium, higher recording density is increasing by desired. A known technique for obtaining a higher recording density is to provide a smooth magnetic layer of a coating type magnetic recording medium. A coating type magnetic recording medium is prepared by coating a non-magnetic support with a magnetic coating composition composed mainly of a ferromagnetic powder and a binder.

In a second technique for obtaining a higher recording density, a ferromagnetic thin film type magnetic recording medium has been developed having a surface of the magnetic layer that is smoother than that of a coating type magnetic recording medium. A ferromagnetic thin film type magnetic recording medium is hereinafter referred to as a "metal thin film type magnetic recording medium".

In the above described recording media, however, if the surface of the magnetic layer is smoothened to improve the electromagnetic characteristics, the coefficient of friction between the magnetic layer and an apparatus (e.g., a video head), is increased during running of the magnetic recording medium. As a result, the magnetic layer of the magnetic recording medium is deteriorated over a short period of use. In an extreme case, the magnetic layer may peel from the support.

In order to solve the above problem, it is known to decrease the coefficient of friction of the magnetic layer surface, for example, by adding a lubricant to the magnetic coating composition or by coating a lubricant onto the surface of the magnetic layer.

As such lubricants, mineral oil, silicone oil, higher alcohols, higher fatty acids, fatty acid esters, animal oils such as cow wax, whale oil and shark oil, and plant oils have heretofore been used.

When the smoothness of the surface of the magnetic layer is further increased, a higher lubricating effect is required. As the addition amount of the above described lubricant is increased, the strength of the magnetic layer is decreased. A decrease in the mechanical strength of the magnetic layer is disadvantageous in that the magnetic layer wears in operation. The resulting powder soils the running path, and sufficient durability for still reproduction is not obtained.

In order to increase the durability of still reproduction, JP-B-28-28367 and 51-39081 (the term "JP-B" as used herein refers to a published examined Japanese patent application) propose the combined use of a fatty acid ester such as butyl stearate and a fatty acid such as myristic acid. In accordance with the working examples disclosed in the above noted patent publications, however, the coefficient of friction is increased during running under highly humid conditions such that the running tension of the magnetic tape is increased.

Although the fatty acid when used alone is effective in improving electromagnetic characteristics, if used in an amount large enough to obtain a greater lubricating effect, the magnetic layer becomes soft and is decreased in mechanical strength. The durability for still reproduction is reduced and, therefore, only a limited amount of the fatty acid can be used. In addition, the combined use of a fatty acid and fatty acid ester as described above is disadvantageous in that the running tension is increased under a high humidity condition of 85% RH (relative hymidity), although under ordinary humidity conditions such as about 50% RH the still durability is improved and the running tension is relatively low.

JP-A-52-7704 (the term "JP-A" as used herein refers to an unexamined published Japanese patent application) discloses use of a hydrocarbyl phosphoric acid ester to improve the plasticity of the magnetic recording layer, or as a dispersing agent for a magnetic paint. The addition of phosphoric acid ester to the magnetic layer increases dispersibility and somewhat improves still durability, but there is no decrease in the coefficient of friction of the magnetic layer surface.

In order to overcome the above problem, JP-A-56-80828 proposes the combined use of a saturated or unsaturated fatty acid and aliphatic hydrocabyl phosphoric acid ester in the magnetic layer. JP-A-56-80828 describes that lubricity at ordinary temperature and high humidity conditions are excellent, and that abrasive resistance and durability for still reproduction are good.

In recent years, with widespread use of commercial flexible disc drive units such as VTR, personal computers and word processors, magnetic recording media have been used under a wide variety of conditions, for example, low temperature conditions or high temperature and high humidity conditions. The magnetic recording medium is desirably not subject to changes in running durability and is stable even when used under the wide range of environmental conditions which are typically encantered. However, a satisfactory result is not obtained with the lubricant described in the above noted JP-A-56-80828.

In addition, as lubricants, higher fatty acid metal salts have been known. These lubricants, however, are not fully satisfactory with respect to reduction in the coefficient of friction, running durability, etc., under a wide range of environmental conditions. For example, JP-B-50-4121 and 52-28686 disclose that use of higher fatty acid metal salts increases lubrilicity, but use of these metal salts is disadvantageous in that crystals of the metal salt deposit on the surface of the tape.

West German Patent Application (OLS) No. 3,347,532A, European Patent Application No. 150,393A, and JP-A-60-160024 describe that the use of hydrophilic zinc stearate increases solubility and prevents the deposition of crystals on the tape surface. The hydrophilic zinc stearate, however, is not fully satisfactory with respect to decreasing the coefficient of friction and for providing good running durability, although the subject substance maintains its lubricating effect under high temperature and high humidity conditions, and under storage conditions.

Another known technique for increasing the running durability is a method in which an abrasive material (hard particles) is added to a magnetic layer. However, when that the abrasive material is added to the magnetic layer to increase the running durability of the magnetic layer, the effect of the abrasive material is not fully realized unless added in a considerably large amount. Namely, it is ultimately difficult to obtain satisfactory running durability by adding the abrasive material without a sacrifice in electromagnetic characteristics and head abrasive properties.

The present inventors have discovered that the above described problems are overcome by employing a hydroxylaluminum salt of a higher fatty acid as a lubricant.

SUMMARY OF THE INVENTION

An object of the present invention is to provide a magnetic recording medium having a low coefficient of friction and excellent running durability even when used under severe conditions such as high temperature and high humidity, which recording medium furthermore maintains these excellent characteristics with substantially no deterioration after long term storage.

The above objective is achieved by providing a magnetic recording medium comprising a non-magnetic support having a magnetic layer provided thereon, wherein a higher fatty acid hydroxylaluminum salt represented by formula (I) is provided in or on the magnetic layer:

$$(R^1COO)_n Al(OH)_{3-n}$$

wherein $R^1$ is a hydrocarbon group having from 10 to 26 carbon atoms, and n is an integer of 1 or 2.

DETAILED DESCRIPTION OF THE INVENTION

In a first embodiment, the magnetic recording medium of the present invention is a coating type magnetic recording medium comprising a non-magnetic support having provided thereon a magnetic layer, containing a ferromagnetic powder and a binder as main components. In a second embodiment, the magnetic recording medium of the present invention is a metal thin film-type magnetic recording medium comprising a non-magnetic support having provided thereon a ferromagnetic metal thin film.

The higher fatty acid hydroxylaluminum salt for use in the present invention is stable alone under severe conditions such as high temperature and high humidity, or low temperature and low humidity as described above, and is not subject to deterioration upon to storage. Moreover, the hydroxylaluminum group strongly adsorbs to a magnetic substance (e.g. metal thin film) or a binder, to thereby exhibit an anchoring effect.

In a coating-type medium of the present invention, the hydroxylaluminum group exhibits a large mutual adsorbing action with the binder. Thus, it is considered that the aliphatic group of the compound of formula (I) is stably present at the surface of the magnetic layer such that there is substantially no reduction in sliding property with the lapse of time.

In a metal thin film medium of the present invention, the hydroxylaluminum group is strongly adsorbed onto the magnetic medium such that even when stored under very severe conditions. There is substantially no change in adsorption. Thus, it is considered that because of the stable presence of the aliphatic chain of the compound of formula (I) at the surface of the magnetic layer, there is substantially no reduction in sliding property with the lapse of time.

On the other hand, other fatty acid metal salts do not have a strong adsorbing group such as the hydroxylaluminum group. Therefore, it is considered that the aliphatic chain is not stably present at the surface of the magnetic layer, thereby leading to an increase of the coefficient of friction.

When a higher fatty acid hydroxylaluminum salt of the present invention is contained in the magnetic layer or is present at the surface of the magnetic layer, even if the medium is used under severe conditions such as high temperature and high humidity conditions (e.g., 40° C. and 90%RH), or low temperature and low humidity conditions (e.g., 10° C. and 10% RH), stable running durability is obtained and moreover, these characteristics are not deteriorated upon storage.

Particularly in a coating-type magnetic recording medium of the present invention, the magnetic layer preferably contains as a binder a resin having at least one polar group selected from an epoxy group,

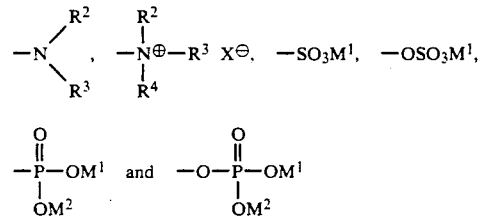

wherein $R^2$, $R^3$ and $R^4$ may be the same or different, and each independently represents a hydrogen atom or an alkyl group, $X^-$ is an anion, $M^1$ and $M^2$ may be the same or different and each independently represents a hydrogen atom, an alkali metal or ammonium. The presence of the resin in the magnetic layer increases dispersing properties of magnetic powder and durability of the magnetic layer, and moreover markedly accelerates the effect of the higher fatty acid hydroxylaluminum salt of the present invention, particularly the above described anchoring effect.

The present invention is described below in detail.

The higher fatty acid hydroxylaluminum salt represented by formula (I) may comprise a mixture of compounds wherein $n=1$ and $n=2$.

The higher fatty acid hydroxylaluminum salt of the present invention is not particularly limited with respect to molecular weight, branch structure, the presence or absence of unsaturated bonds, and isomeric structure as long as the compound is a hydroxylaluminum salt of higher fatty acid having from 10 to 26 carbon atoms, preferably from 16 to 22 carbon atoms, excluding the carbon of the carboxyl group, i.e., for $R^1$ in formula (I). The hydrocarbon group represented by $R^1$ is preferably a streight chain alkyl group.

Representative examples of the compound represented by formula (I) are shown below.

| | |
|---|---|
| $(CH_3(CH_2)_9COO)Al(OH)_2$ | Compound 1 |
| $CH_3(CH_2)_9COOAl(OH)_2$ | Compound 2 |
| $(CH_3(CH_2)_{11}COO)_2Al(OH)$ | Compound 3 |

| | |
|---|---|
| $CH_3(CH_2)_{11}COOAl(OH)_2$ | Compound 4 |
| $(CH_3(CH_2)_{17}COO)_2Al(OH)$ | Compound 5 |
| $CH_3(CH_2)_{17}COOAl(OH)_2$ | Compound 6 |
| $(CH_3(CH_2)_{11}CHCOO)_2Al(OH)$<br>    $\|$<br>    $CH_2CH_3$ | Compound 7 |
| $(CH_3(CH_2)_{13}CHCOO)Al(OH)_2$<br>    $\|$<br>    $CH_2CH_3$ | Compound 8 |
| $CH_3(CH_2)_{15}COOAl(OH)_2$ | Compound 9 |
| $CH_3(CH_2)_{13}COOAl(OH)_2$ | Compound 10 |
| $(CH_3(CH_2)_{19}COO)_2Al(OH)$ | Compound 11 |
| $CH_3(CH_2)_{19}COOAl(OH)_2$ | Compound 12 |
| $(CH_3(CH_2)_{21}COO)_2Al(OH)$ | Compound 13 |
| $CH_3(CH_2)_{21}COOAl(OH)_2$ | Compound 14 |
| $(CH_3(CH_2)_7CH=CH(CH_2)_7COO)_2Al(OH)$ | Compound 15 |
| $(CH_3(CH_2)_7CH=CH(CH_2)_7COO)Al(OH)_2$ | Compound 16 |
| $(CH_3(CH_2)_{25}COO)_2Al(OH)$ | Compound 17 |
| $CH_3(CH_2)_{25}COOAl(OH)_2$ | Compound 18 |

The compound represented by formula (I) preferably contains a linear hydrocarbon group.

The compound represented by formula (I) can be obtained, for example, by adding dropwise an aqueous solution of aluminum hydroxide or sodium aluminate to a fatty acid chloride at 60° C. with stirring, separating the resulting precipitates by filtration and then recrystallizing from a solvent such as alcohols and acetone.

In the present invention, the higher fatty acid hydroxylaluminum salt represented by formula (I) can be introduced into the magnetic layer by methods including; (i) a method wherein the compound represented by formula (I) is uniformly distributed within the magnetic layer (by dispersing the compound in the magnetic coating composition), and (ii) a method wherein the compound represented by formula (I) is top-coated onto the surface of the magnetic layer for a coating-type magnetic recording medium. In a metal thin film-type of the present invention, the compound represented by formula (I) may be top-coated onto the surface of the magnetic layer.

When the compound of formula (I) is uniformly distributed within the magnetic layer of a coating-type magnetic recording medium of the present invention, the compound represented by formula (I) is contained in the magnetic layer in an amount of from 0.1 to 8% by weight, preferably from 0.3 to 2% by weight, based on the weight of the ferromagnetic powder. When the compound represented by formula (I) is top-coated onto the surface of a magnetic layer of a coating-type magnetic recording medium, the compound is applied in an amount of from 2 to 50 mg/m$^2$, preferably from 3 to 20 mg/m$^2$, of the recording medium. When the compound represented by formula (I) is top-coated onto the surface of a metal thin film-type magnetic recording medium, the compound is applied in an amount of from 2 to 30 mg/m$^2$, preferably from 3 to 10 mg/m$^2$.

If the compound used represented by formula (I) is used in an amount greater than the above described ranges, the excess higher fatty acid hydroxylaluminum salt results in sticking and moisture absorption, precipitation of crystals onto the tape surface and a reduction in durability.

If the compound represented by formula (I) is used in an amount less than the above described ranges, the desired effect is not obtained.

In the present invention, the fatty acid hydroxylaluminum salt represented by formula (I) may be used in combination with other lubricants.

Lubricants for use in combination with the compound represented by formula (I) include saturated or unsaturated fatty acids (e.g., myristic acid, stearic acid, oleic acid, etc.) or their metal soaps, N-substituted or N-unsubstituted fatty acid amides, fatty acid esters (various monoesters, fatty acid esters with polyhydric alcohols such as sorbitan and glycerine, esterified products of polybasic acids, etc.), ester compounds containing an ether bond, higher aliphatic alcohols, monoalkyl phosphates, dialkyl phosphates, trialkyl phosphates, paraffins, silicone oil, animal or plant oils, mineral oils, higher aliphatic amines; inorganic powders such as graphite, silica, molybdenum disulfide and tungsten disulfide; resin powders such as polyethylene, polypropylene, polyvinyl chloride, an ethylene-vinyl chloride copolymer and polyetetrafluoroethylene; α-olefin polymers; unsaturated aliphatic hydrocarbons which are liquids at room temperature, terminal-modified or unmodified perfluoroalkylpolyether, fluorocarbon, and the like.

Although the amount of lubricant for use in combination with the compound represented by formula (I) varies with the particular application, an amount of 1/10 to 2 times (by weight) of the compound of formula (I) may generally be employed.

Methods for incorporating the higher fatty acid hydroxylaluminum salt in the magnetic layer include a method involving adding the compound to a magnetic coating composition to uniformly introduce the compound into the magnetic layer, and methods for top-coating the compound onto the surface of the magnetic layer include a method wherein the compound is dissolved in an organic solvent, coated or sprayed onto a substrate, and then dried; a method wherein the compound is melted and coated onto a substrate; a method wherein a substrate is soaked in an organic solvent containing the dissolved compound represented by formula (I), such that the salt is adsorbed onto the surface of the substrate; a Langmuir-Project method; and the like.

The ferromagnetic powder for use in the present invention includes ferromagnetic iron oxide powder, Co-doped ferromagnetic iron oxide powder, ferromagnetic chromium dioxide powder, ferromagnetic metal powder, ferromagnetic alloy powder, barium ferrite, and the like.

The ferromagnetic alloy powder contains at least 75% by weight of metal components, with at least 80% by weight of the metal component being at least one ferromagnetic metal or alloy (e.g., Fe, Co, Ni, Fe-Co, Fe-Ni, Co-Ni, Co-Fe-Ni, etc.), and not more than 20% by weight of the metal component being other components (e.g., Al, Si, S, Sc, Ti, V, Cr, Mn, Cu, Zn, Y, Mo, Rh, Pd, Ag, Sn, Sb, B, Ba, Ta, W, Re, Au, Hg, Pb, P, La, Ce, Pr, Nd, Te, Bi, etc.). The above described ferromagnetic metal component may contain a small amount of water, hydroxide or oxide.

The ferromagnetic powder for use in the present invention can be prepared by methods known in the art.

There are no special limitations with respect to the form and size of the ferromagnetic powder; namely, a wide variety of ferromagnetic powders can be used. The form may be needle-like, grain-like, spherical, cubic, plate-like, or the like. A needle-like or plate-like ferromatic powder is preferred with respect to the electromagnetic characteristics. Although the crystal size and a specific surface area are not limited, the crystal size is preferably not more than 400 Å, and $S_{BET}$ is preferably at least 30 m$^2$/g.

There are no special limitations with respect to the pH of the ferromagnetic powder or its surface treatment, either. The surface treatment may be carried out, for example, with a substance containing an element such as titanium, silica or aluminum, or with an organic compound such as a carboxylic acid, sulfonic acid, sulfuric acid ester, phosphoric acid, phosphoric acid ester or an adsorbing compound containing a nitrogen-containing heterocyclic ring, e.g., benzotriazole. The pH is preferably in a range of from 5 to 10.

In the case of the ferromagnetic iron oxide powder, the ratio of divalent iron to trivalent iron is not critical.

The binder for use in the present invention includes a thermoplastic resin, a thermosetting resin, a radiation-curable resin, a reactive resin or a mixture thereof. Binders conventionally used for magnetic recording media can be used in the present invention.

The resin binder of the present invention has a glass transition temperature (Tg) of from −40° C. to 150° C., and a weight average molecular weight of from 10,000 to 300,000 and preferably from 10,000 to 100,000.

Examples of the thermoplastic resin for use as a binder in the present invention include vinyl-based copolymers such as a vinyl chloride-vinyl acetate copolymer, copolymers of vinyl chloride, vinyl acetate, vinyl alcohol and maleic acid and/or acrylic acid, a vinyl chloride-vinylidene chloride copolymer, a vinyl chloride-acrylonitrile copolymer, an ethylene-vinyl acetate copolymer, cellulose derivatives such as nitrocellulose, cellulose acetate propionate, and a cellulose acetate butylate resin, an acryl resin, a polyvinyl acetal resin, a polyvinyl butyral resin, a polyesterpolyurethane resin, a polyether-polyurethane resin, a polycarbonatepolyurethane resin, a polyester resin, a polyether resin, a polyamide resin, an amino resin, a rubber-based resin such as a styrene-butadiene resin and a butadiene-acrylonitrile resin, a silicone-based resin, and a fluorine-based resin.

Of these resins, a vinyl chloride-based resin is preferred because of its high ability to disperse therein the ferromagnetic fine powder.

Examples of the thermosetting resin or reactive resin for use as a binder in the present invention include compounds whose molecular weight increases on heating, such as a phenol resin, a phenoxy resin, an epoxy resin, a curable polyurethane resin, a urea resin, a melamine resin, an alkyd resin, a silicone resin, an acryl-based reactive resin, an epoxy-polyamide resin, a nitrocellulose-melamine resin, a mixture of a high molecular weight polyester resin and an isocyanate prepolymer, a urea-formaldehyde resin, a mixture of a low molecular weight glycol, high molecular weight diol and polyisocyanate, a polyamine resin, and a mixtures thereof.

Examples of the radiation-curable resin for use as a binder in the present invention include those obtained by bonding a group containing a carbon-carbon unsaturated bond as a radiation-curable functional group to the above described thermoplastic resin. Preferred functional groups are an acryloyl group, a methacryloyl group and the like.

It is preferred to introduce into the above described resins at least one polar group selected from an epoxy group,

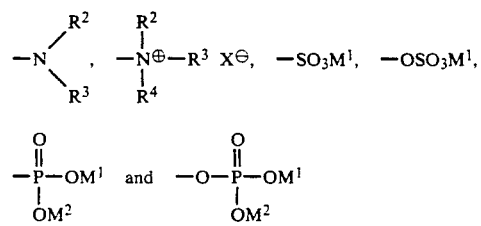

wherein $R^2$, $R^3$ and $R^4$ may be the same or different, and each independently represents a hydrogen atom or an alkyl group preferably having 1 to 5 carbon atoms, $X^\ominus$ is an anion such as a halogen ion ($I^\ominus$, $Cl^\ominus$, $Br^\ominus$ or $F^\ominus$, with $Cl^\ominus$ and $Br^\ominus$ being preferred), and $M^1$ and $M^2$ may be the same or different and each independently represents a hydrogen atom, an alkali metal (e.g., Na, K and Li, with Na and K being preferred), or ammonium. The above described polar group-containing resin increases the dispersibility of the ferromagnetic powder and increases durability. Furthermore, the effect of the higher fatty acid hydroxylaluminum salt represents by formula (I) of the present invention is enhanced by the presence of the polar group-containing resin. The polar group content in the resin is preferably from $10^{-7}$ to $10^{-4}$ equivalent per gram of the resin and more preferably from $10^{-6}$ to $10^{-4}$ equivalent per gram of the resin. The content of the polar group-containing resin is preferably at least 5% by weight and not more than 30% by weight based on the total binder resin (including curing agents as described below) of the magnetic layer.

The above described resin binders can be used alone or in combination, and they may be cured by adding a known curing agent such as isocyanate-based cross-linking agents and radiation-curable vinyl-based monomers in an amount suitable for effecting the curing reaction.

The isocyanate-based cross-linking agent is a polyisocyanate compound containing at least two isocyanate groups. Examples include isocyanates such as tolylene diisocyanate, 4,4-diphenylmethane diisocyante, hexamethylene diisocyante, xylylene diisocyante, naphthylene 1,5-diisocyanate, o-toluidine diisocyante, isophorone diisocyante, and triphenylmethane diisocyanate, reaction products of these isocyantes and polyalcohols, and polyisocyantes resulting from condensation of these isocyanates. The above described polyisocyanates are available the under trade names of Colonate L, Colonate HL, Colonate H, Colonate EH, Colonate 2014, Colonate 2030, Colonate 2031, Colonate 2036, Colonate 3015, Colonate 3040, Colonate 3041, Millionate MR, Millionate MTL, Daltoseck 1350, Daltoseck 2170, and Daltoseck 2280 manufactured by Nippon Polyurethane Kogyo Co., Ltd., under the trade names of Takenate D102, Takenate D110N, Takenate D200, and Takenate D202 manufactured by Takeda Chemical Industries, Ltd., under the trade name of Sumidule N75 manufactured by Sumitomo Bayer Co., Ltd., under the trade names of Desmodule L, Desmodule IL, Desmodule N and Desmodule HL manufactured by Bayer Corp. (Germany), and the under trade names of Barnock D850 and Barnock D802 manufactured by DAINIPPON INK AND CHEMICALS, INK.

The radiation-curable vinyl-based monomer for use in the present invention is a compound which undergoes polymerization upon irradiation, and which contains at least one carbon-carbon unsaturated bond in the molecule thereof. Examples include acrylic or methacrylic acid esters, acryl or methacrylamides, allyl compounds, vinyl ether compounds, vinyl esters, vinyl heterocyclic compounds, N-vinyl compounds, styrene, acrylic or mathacrylic acid, crotonic acid, itaconic acid, and olefins. Of these compounds, those having at least two acryloyl or methacyloyl groups are preferred, including acrylate or methacrylate of polyethylene glycol, such as diethyleneglycol diacrylate or dimethacrylate, and triethyleneglycol diacrylate or dimethacrylate, trimethylolpropane triacrylate or trimethacrylate, pentaerythritol tetraacrylate or tetramethacrylate, dipentaerythritol pentaacrylate or pentamethacrylate, dipentaerythritol hexaacrylate or hexamethacrylate, and a reaction product of polyisocyanate and hydroxyacrylate or hydroxymethacrylate.

The curing agent is preferably used in an amount of from 5 to 45% by weight based on the total weight of the binder containing the cross-linking agent.

The amount of the binder (containing the curing agent) contained in the magnetic layer of the present invention is from 10 to 40% by weight, preferably from 15 to 30% by weight based on the weight of the ferromagnetic powder contained in the magnetic layer. If the amount of the binder compound is in excess of the above range, the degree of charging of the ferromagnetic fine powder is low, leading to a decrease in electromagnetic characteristics. On the other hand, if the binder contact is too low, running durability is decreased.

The non-magnetic support for use in the present invention may be prepared from polyesters such as polyethylene terephthalate and polyethylene-2,6-naphthalate, polyolefins such as polyethylene and polypropylene, cellulose derivatives such as cellulose triacetate, polycarbonate, polyimide, polyamideimide, and the like. If necessary, the support may be metallized with a metal such as aluminum, or the support may constitute a metal foil such as an aluminum foil or a stainless steel foil.

The support may be in the form of a tape, disc, film, sheet, card or drum, for example, and depending on the media, a suitable material is selected for the non-magnetic support.

The thickness of the non-magnetic support is from 3 to 100 $\mu$m; and it is preferably from 3 to 20 $\mu$m in the case of a magnetic tape, and it is preferably from 20 to 100 $\mu$m in the case of a magnetic disc.

The magnetic layer of the magnetic recording medium of the present invention preferably contains inorganic particles having a Mohs' hardness of at least 5.

The inorganic particles for use in the present invention are not particularly limited as long as they have a Mohs' hardness of at least 5. Examples of such inorganic substances are $Al_2O_3$ (Mohs' hardness 9), TiO (Mohs' hardness 6), $TiO_2$ (Mohs hardness 6.5), $SiO_2$ (Mohs hardness 7), $SnO_2$ (Mohs' hardness 6.5), $Cr_2O_3$ (Moh' hardness 9), and $\alpha$-$Fe_2O_3$ (Mohs' hardness 5.5). These inorganic particles can be used alone or in combination.

Particularly preferred are inorganic particles having a Mohs' hardness of at least 8. If inorganic particles having a Mohs' hardness of less than 5 are used, the inorganic particles easily separate from the magnetic layer such that there is little head abrasion action. Head clogging then readily occurs and the running durability deteriorates.

The inorganic particles are generally contained in the magnetic layer in an amount of from 0.1 to 20 parts by weight, preferably from 1 to 10 parts by weight, per 100 parts by weight of the ferromagnetic powder.

It is desirable that the magnetic layer contains, as well as the above inorganic substance particles, carbon black (particularly carbon black having an average particle diameter of from 10 to 300 nm) and the like.

A method of preparing the coating-type magnetic recording medium of the present invention is described below.

First, a ferromagnetic powder, a binder, and if necessary, a filler, an additive, etc. are mixed together with a solvent, kneaded and dispersed in the solvent to prepare a magnetic coating composition. Solvents conventionally used for kneading in preparation of a magnetic coating composition can be used in the present invention.

The kneading method is not critical, and the order in which the components are added is readily determined by one of ordinary skill in the art. For example, a lubricant, an additive and a cross-linking agent are dissolved in an organic solvent in advance, and just prior to coating, the mixture of the above noted components is added to a magnetic substance dispersion comprising a solvent, a binder, a magnetic powder and the like.

In preparing the magnetic coating composition, known additives such as a dispersing agent, an antistatic agent, and a lubricant can be used, alone or in combination.

Dispersing agents for use in the present invention include known dispelsing agents including fatty acids having from 12 to 22 carbon atoms, or their salts or their esters, compounds obtained by replacing a part or all of hydrogen atoms of the above compounds with a fluorine atom, amides of the above fatty acids, aliphatic amines, higher alcohols, alkylboric acid esters, salcosinate, alkyletheresters, trialkylpolyolefins and lecithin, and low molecular weight epoxy compounds.

The dispersing agent is generally used in an amount of from 0.1 to 10 parts by weight per 100 parts by weight of the ferromagnetic powder.

Examples of the antistatic agent for use in the present invention include electrically conductive fine powders such as carbon black and carbon black-graft polymers; natural surface active agents such as saponin; nonionic surface active agents such as alkylene-, glycerine- or glycidol-based agents; cationic surface active agents such as higher alkylamines, salts of heterocyclic compound (e.g., pyridine), phosphonium salts, or sulfoniums; anionic surface active agents containing an acidic a group such as carboxylic acid, phosphoric acid, sulfuric acid ester group, other phosphoric acid ester groups, and the like; and amphoteric surface active agents such as amino acids, aminosulfonic acids, and sulfuric or phosphoric acid esters of aminoalcohol.

The above described electrically conductive fine powder is used as an antistatic agent in an amount of from 0.1 to 10 parts by weight per 100 parts by weight of the ferromagnetic powder. The surface active agent (when used as an antistatic agent) is used in an amount of from 0.12 to 10 parts by weight per 100 parts by weight of the ferromagnetic powder.

The above noted additives such as a dispersing agent, an antistatic agent and a lubricant are not necessarily limited to the single named function. For example, the dispersing agent can sometimes acts as a lubricant or an antistatic agent. When a substance having more than one function is used, the addition amount of the substance is determined by taking into consideration the various functions of the substance.

The magnetic coating composition thus prepared is then coated onto the above described non-magnetic support. A plurality of magnetic coating compositions may be coated successively or at the same time. The magnetic recording medium of the present invention may comprise a plurality of magnetic layers.

Although the magnetic coating composition can be coated directly onto the non-magnetic support, it also can be coated onto the non-magnetic support via an intermediate layer such as an adhesive layer. The intermediate layer as used herein refers to a layer of an adhesive alone, or a composite layer of a binder with non-magnetic fine particles (e.g., carbon) dispersed therein arranged between the non-magnetic support and a first magnetic layer.

The binder for use in the intermediate layer containing carbon is appropriately selected from various binders that are used in the magnetic layer. The particle diameter of the carbon is preferably 10 to 50 nm, and the weight ratio of the binder to the carbon is preferably from 100:10 to 100:150. The thickness of the intermediate layer is preferably 0.1 to 2 $\mu$m in the case of an adhesive layer alone, and in the case of the composite layer containing a non-magnetic powder, the thickness is preferably from 0.5 to 4 $\mu$m.

A lubricant may be added to the intermediate layer which is the same or different from the lubricant used in the magnetic layer.

A method for dispersing the ferromagnetic powder and the binder, a method of coating onto the support, etc. which may be used in preparing the magnetic recording medium of the present invention are described in detail in JP-A-54-46011 and 54-21805.

Coating is carried out such that the thickness of the magnetic layer after drying is generally in the range of from 0.5 to 10 $\mu$m and preferably in the range of from 0.7 to 6.0 $\mu$m.

When the magnetic recording medium of the present invention is used in the form of a tape, the magnetic layer coated onto the non-magnetic support is usually subjected to treatment to orient the ferromagnetic powder in the magnetic layer, namely, magnetic field orientating treatment, and is then dried. On the other hand, in the case of a disc-like medium, in order to eliminate anisotropy of magnetic characteristics, a randomizing treatment with a magnetic field is applied. Moreover, if desired, a surface smoothing treatment, and heat-curing and/or curing with irradiation is conducted, and thereafter, the medium is cut into the desired form.

The side of the non-magnetic support opposite that having the magnetic layer may be provided with a known back layer.

Next, the metal thin film-type magnetic recording medium of the present invention is described below.

In the metal thin film-type magnetic recording medium of the present invention, one or more films of a ferromagnetic metal material are provided on a support by vacuum deposition, preferably oblique vacuum deposition.

The obliqued vacuum deposition as used herein means a method wherein the magnetic thin film is deposited by injecting a vapor stream of the ferromagnetic metal material at an incident angel $\theta$ relative to the normal line of the surface of the substrate.

In the present invention, the incident angle is preferably 45° to 90°, and the incident angle $\theta$ max and the incident angle $\theta$ min are desirably 60° to 90° and 45° to 75°, respectively.

Ferromagnetic metal thin film materials for use in the present invention include metals such as Fe, Co and Ni, and ferromagnetic alloys such as Fe-Co, Fe-Ni, Co-Ni, Fe-Co-Ni, Fe-Rh, Fe-Cu, Co-Cu, Co-Au, Co-Y, Co-La, Co-Pr, Co-Gd, Co-Sm, Co-Pt, Ni-Cu, Mn-Bi, Mn-Sb, Mn-Al, Fe-Cr, Co-Cr, Ni-Cr, Fe-Co-Cr, Ni-Co-Cr, and Fe-Co-Ni-Cr, etc. Particularly preferred are Co and alloys containing at least 75% by weight of Co.

The ferromagnetic metal thin film is sufficiently thick to provide a suitable output of the magnetic recording medium, and is thin enough to allow for high density recording. In general, the thickness of the ferromagnetic thin film is from about 0.02 to 5.0 $\mu$m and preferably from 0.05 to 2.0 $\mu$m. When two or more metal thin films are laminated, the thickness of each thin film may be designed to equal the other magnetic thin films, or it may be provided in a thickness of ±50% of the ferromagnetic metal thin film provided closest to the substrate.

The vacuum deposition as used herein includes, as well as a conventional vacuum deposition described in U.S. Pat. No. 3,342,632, a method in which a vapor stream is ionized and accelerated by application of electric or magnetic field, or irradiation with electron beam in an atmosphere where the average free path of the vaporized molecule is large, such that a ferromagnetic metal thin film is formed on the support. For example, the electric field vacuum deposition method described in JP-A-51-149008, and the ionized vacuum deposition method described in JP-B-43-11525, 46-20484, 47-26579, 49-45439, JP-A-49-33890, 49-34483, and 49-54235 can be used in the present invention.

As the substrate for use in the ferromagnetic metal thin film-type magnetic recording medium of the present invention, plastic bases such as polyethylene terephthalate, polyimide, polyamide, polyvinyl chloride, cellulose triacetate, polycarbonate, and polyethylene naphthalate are preferably used. In the present invention, the above flexible plastic base having a surface roughness (Ra) of not more than 0.012 $\mu$m is preferably used. The surface roughness (Ra) as used herein means a central line average roughness as described in JIS-B0601, with a cut off of 0.25 nm. In addition, a substrate prepared by providing a subbing layer on the above plastic base such the surface roughness (Ra) is not more than 0.012 mm can be used.

Furthermore, a non-magnetic layer may be interposed between the laminated ferromagnetic metal thin films. The non-magnetic intermediate layer is preferably a layer composed of Cr, Si, Al, Mn, Bi, Ti, Sn, Pb, In, Zn, Cu or their oxides or nitrides.

The effects of the higher fatty acid hydroxylaluminum salt of the present invention include high reproduction output, low coefficient of friction under wide temperature and humidity ranges and excellent running durability. Substantially, the coefficient of friction does not substantially change with a lapse of time, and excellent running durability is maintained.

On the other hand, in the case of using conventional fatty acids, the effect of the decrease in the coefficient of friction is markedly reduced with a lapse of time. Moreover the metal salts of fatty acids, or fatty acid esters do not adequately decrease the coefficient of friction, and their effect is even further reduced with a lapse of time.

The higher fatty acid hydroxylaluminum salt of the present invention is unexpectedly superior to conventional higher fatty acid aluminum salts with respect to a decrease obtained thereby in the coefficient of friction and also the ability to maintain that effect under adverse conditions of temperature and humidity and upon storage for extended periods.

The present invention is described in greater detail with reference to the following non-limiting examples. All parts are given by weight.

EXAMPLE 1

A composition shown below was kneaded and dispersed for 48 hours by the use of an open kneader and a sand mill, and then 5 parts of polyisocyanate was added thereto. The resulting mixture was kneaded and dispersed for one hour and then filtered by use of a filter having an average pore diameter of 1 μm to prepare a magnetic coating composition.

| Composition of Magnetic coating composition | |
|---|---|
| Ferromagnetic Alloy Powder | 100 parts |
| (Composition: Fe 94%, Zn 4%, Ni 2% | |
| Cohesive force: 1,500 Oe | |
| Specific surface area: 54 mg/m$^2$) | |
| Vinyl Chloride-Based Binder (A) or | 12 parts |
| (B) as shown below | |
| Polyester-Based Polyurethane Binder (C) | 5 parts |
| (Weight average molecular weight: 40,000 | |
| Number average molecular weight: 25,000 | |
| Kind and number of polar groups are | |
| shown in Table 1) | |
| Abrasive Material (α-alumina, average | 5 parts |
| particle diameter: 0.3 um) | |
| Lubricant | (Shown in Table 1) |
| Oleic acid | 1 part |
| Butyl stearate | 1 part |
| Carbon black (average particle | 2 parts |
| diameter: 40 nm) | |

| Composition of Magnetic coating composition | |
|---|---|
| Methyl Ethyl Ketone | 300 parts |

As the above vinyl chloride-based binder, (A) a vinyl chloride-vinyl acetate-maleic anhydride copolymer (produced by Nippon Zeon Co., Ltd., 400X110A, degree of polymerization: 400), or (B) a vinyl chloride-vinyl acetate copolymer (degree of polymerization: 400)

was used as shown in Table 1.

The magnetic coating composition thus obtained was coated on a 10 μm-thick polyethylene terephthalate support by the use of a reverse roll in a dry thickness of 4.0 μm. While the applied magnetic coating composition was wet, magnetic field orientation was carried out with a magnet of 3,000 gauss. After drying, the magnetic recording medium was subjected to supercalendering treatment. The material was slit into 8-mm wide portions to produce a 8-mm video tape sample.

The vide tape sample thus obtained was then evaluated for reproduction output, coefficient of friction (μ) under high temperature and high humidity conditions (40° C., 90% RH, Condition a), and the coefficient of friction after a forced acceleration test (90° C., one week, Condition b) by the methods described below. The results are shown in Table 1.

Reproduction Output

A 7 MHz signal was recorded on the video tape by the use of VTR (FUJIX-8, produced by Fuji Photo Film Co., Ltd.) and then reproduced. With the reproduction output of 7 MHz recorded on the standard tape (Comparative Sample 16) as 0 dB, the relative reproduction output of the video tape was measured.

Coefficient of Friction (μ)

The magnetic layer of the video tape was brought into contact with a stainless pole under a tension (T1) of 50 g and at a winding angle of 180°, and in this state, a tension (T2) necessary for running the video tape at a speed of 3.3 cm/sec was measured. The coefficient of friction (μ) of the video tape was determined according to the following equation.

$$\mu = 1/\pi \cdot ln(T_2/T_1)$$

The test for the coefficient of friction was carried out under 40° C. and 90% RH (Condition a).

Moreover, the video tape was stored for one week at 90° C. (forced acceleration test, Condition b) and, thereafter, was measured for the coefficient of friction. Storage stability was evaluated as a difference or change in the coefficient of friction (μ) between Conditions a and b.

TABLE 1

| | Components | | | | | Performance | | |
|---|---|---|---|---|---|---|---|---|
| | Type of | Polyurethane Binder | | Lubricant | | | μ Value | |
| | Vinyl | | Content | | Amount | Reproduction | | |
| Sample | Chloride | Polar | of Polar | Compound | (parts by | Output | Condition | Condition |
| No.*** | Binder | Group | Group* | No. | weight) | (dB) | a | b |
| 1 | A | SO$_3$Na | 1 × 10$^{-5}$ | 1 | 0.5 | +0.5 | 0.22 | 0.22 |
| 2 | A | SO$_3$Na | 1 × 10$^{-5}$ | 4 | 0.5 | +0.5 | 0.21 | 0.21 |
| 3 | A | OSO$_3$Na | 1 × 10$^{-5}$ | 5 | 0.5 | +0.5 | 0.20 | 0.20 |
| 4 | A | SO$_3$Na | 1 × 10$^{-5}$ | 7 | 0.5 | +0.5 | 0.23 | 0.23 |
| 5 | A | SO$_3$Na | 1 × 10$^{-5}$ | 13 | 0.5 | +0.5 | 0.21 | 0.21 |
| 6 | A | PO$_3$Na$_2$ | 1 × 10$^{-5}$ | 16 | 0.5 | +0.5 | 0.22 | 0.22 |

TABLE 1-continued

| | Components | | | | | Performance | | |
|---|---|---|---|---|---|---|---|---|
| | Type of | Polyurethane Binder | | Lubricant | | | | |
| | Vinyl | | Content | | Amount | Reproduction | $\mu$ Value | |
| Sample | Chloride | Polar | of Polar | Compound | (parts by | Output | Condition | Condition |
| No.*** | Binder | Group | Group* | No. | weight) | (dB) | a | b |
| 7 | A | SO$_3$Na | $1 \times 10^{-5}$ | 17 | 0.5 | +0.5 | 0.21 | 0.21 |
| 8 | B | SO$_3$Na | $1 \times 10^{-7}$ | 6 | 0.5 | +0.5 | 0.23 | 0.23 |
| 9 | B | SO$_3$Na | $1 \times 10^{-6}$ | 6 | 0.5 | +0.5 | 0.20 | 0.21 |
| 10 | B | OSO$_3$Na | $1 \times 10^{-5}$ | 6 | 0.5 | +0.5 | 0.20 | 0.20 |
| 11 | B | SO$_3$Na | $1 \times 10^{-4}$ | 6 | 0.5 | +0.5 | 0.20 | 0.20 |
| 12 | B | SO$_3$Na | $1 \times 10^{-3}$ | 6 | 0.5 | +0.5 | 0.24 | 0.24 |
| 13 | B | SO$_3$Na | $1 \times 10^{-5}$ | none | none | −1.0 | 0.60 | 0.60 |
| 14 | B | none | none | 6 | 0.5 | +0.5 | 0.24 | 0.24 |
| 15 | B | none | none | 14 | 0.5 | +0.5 | 0.25 | 0.25 |
| 16 | A | SO$_3$Na | $1 \times 10^{-5}$ | stearic acid | 0.5 | ±0.0 | 0.25 | 0.32 |
| 17 | A | SO$_3$Na | $1 \times 10^{-5}$ | butyl stearate | 0.5 | −0.5 | 0.31 | 0.40 |
| 18 | A | SO$_3$Na | $1 \times 10^{-5}$ | zinc stearate | 0.5 | +0.5 | 0.31 | 0.33 |
| 19 | A | SO$_3$Na | $1 \times 10^{-5}$ | C$_{17}$H$_{35}$COOCa(OH) | 0.5 | +0.5 | 0.33 | 0.33 |
| 20 | A | SO$_3$Na | $1 \times 10^{-5}$ | C$_{17}$H$_{35}$COONa | 0.5 | +0.5 | 0.35 | 0.38 |
| 21 | A | SO$_3$Na | $1 \times 10^{-5}$ | (C$_{17}$H$_{35}$COO)$_3$Al | 0.5 | +0.5 | 0.30 | 0.33 |
| 22 | A | SO$_3$Na | $1 \times 10^{-5}$ | zinc stearate** | 0.5 | +0.5 | 0.28 | 0.28 |

*Equivalent per gram of the resin.
**Containing 6% stearyl benzosulfonate and 4% sodium sulfate.
***Samples 13 and 16 to 22 are comparative samples.

EXAMPLE 2

A nickel-cobalt magnetic film (film thickness 150 nm) was oblique vacuum deposited on a 13 μm-thick polyethylene terephthalate film to produce the original material for a magnetic recording medium. Particularly, as a vacuum deposition source, an electron beam vacuum deposition source was used, and a cobalt-nickel alloy (Co: 80 wt %, Ni: 20 wt %) was charged and oblique vacuum deposited in a vacuum of $5 \times 10^{-5}$ Torr in a stream of oxygen at an incident angle of 50°.

Using the thus obtained original material for the magnetic recording medium, various 8-mm video tapes designated as Sample Nos. 23 to 36 were prepared by coating on the magnetic metal thin film of the original material a solution of the lubicant shown in Table 2 dissolved in methanol in the case of Sample Nos. 23 to 30 and Nos. 34 to 36, and in methyl ethyl ketone in the case of Sample Nos. 32 and 33, followed by drying and slitting into 8-mm width.

The video tape samples thus obtained were evaluated for the reproduction output and the coefficient of friction ($\mu$) under Conditions a and b in the same manner as in Example 1.

With the reproduction output of 7 MH recording on the standard tape (Comparative Example 32) as 0 dB, the relative reproduction output of each video tape was determined. The results are shown in Table 2.

TABLE 2

| | Lubricant | | Performance | | |
|---|---|---|---|---|---|
| | | | Reproduction | $\mu$ Value | |
| Sample** | | Amount | Output | Condition | Condition |
| No. | Compound No. | (mg/m$^2$) | (dB) | a | b |
| 23 | 2 | 10 | +0.5 | 0.23 | 0.23 |
| 24 | 4 | 10 | +0.5 | 0.22 | 0.22 |
| 25 | 5 | 10 | +0.5 | 0.21 | 0.21 |
| 26 | 6 | 10 | +0.5 | 0.21 | 0.21 |
| 27 | 8 | 10 | +0.5 | 0.24 | 0.24 |
| 28 | 13 | 10 | +0.5 | 0.22 | 0.22 |
| 29 | 16 | 10 | +0.5 | 0.24 | 0.24 |
| 30 | 18 | 10 | +0.5 | 0.23 | 0.23 |
| 31 | none | 10 | +0.5 | 0.50 | 0.60 |
| 32 | stearic acid | 10 | ±0.0 | 0.28 | 0.33 |
| 33 | butyl stearate | 10 | −0.5 | 0.38 | 0.50 |
| 34 | zinc stearate | 10 | +0.5 | 0.30 | 0.34 |
| 35 | C$_{17}$H$_{35}$COOCa(OH) | 10 | +0.5 | 0.32 | 0.34 |
| 36 | C$_{17}$H$_{35}$COONa | 10 | +0.5 | 0.33 | 0.38 |
| 37 | (C$_{17}$H$_{35}$COO)$_3$Al | 10 | +0.5 | 0.29 | 0.34 |
| 38 | zinc stearate* | 10 | +0.5 | 0.29 | 0.29 |

*Containing 6% of stearylbenzosulfonate and 4% of sodium sulfate.
**Samples Nos. 31 to 38 are comparative samples.

It is clearly seen from the results of Tables 1 and 2 that the samples of the present invention containing a higher fatty acid hydroxylaluminum salt represented by formula (I) have a high reproduction output and a low coefficient of friction.

Moreover, it was determined that there was substantially no change in the coefficient of friction upon storage under adverse conditions.

On the other hand, it is clearly seen that when a conventional fatty acid is substituted for the compound of formula (I), there is a marked deterioration in the coefficient of friction upon storage under adverse conditions, and in the case of fatty acid metal salts, the coefficient of friction is high.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising a non-magnetic support having provided thereon a magnetic layer comprising a ferromagnetic powder and a binder, wherein a higher fatty acid hydroxylaluminum salt represented by formula (I) is contained in the magnetic layer in an amount of from 0.1 to 8% by weight based on the weight of the ferromagnetic powder or is top-coated onto the surface of the magnetic layer in an amount of from 2 to 50 mg/m² of the magnetic recording medium:

$$(R^1COO)_nAl(OH)_{3-n} \qquad (I)$$

where $R^1$ is a hydrocarbon group having from 10 to 26 carbon atoms, and n is an integer of 1 or 2.

2. A magnetic recording medium as in claim 1, wherein said binder contains a resin having at least one polar group selected from the group consisting of:
an epoxy group,

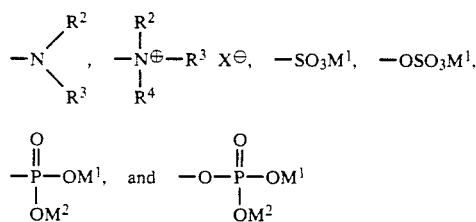

wherein $R^2$, $R^3$ and $R^4$ which may be the same or different, each independently represents a hydrogen atom or an alkyl group, $X^{\ominus}$ is an anion, and $M^1$ and $M^2$ may be the same or different and each independently represents a hydrogen atom, an alkali metal or ammonium.

3. A magnetic recording medium as in claim 1 wherein said $R^1$ is a linear hydrocarbon group.

4. A magnetic recording medium as in claim 1, wherein said hydroxylaluminum salt represented by formula (I) is contained in the magnetic layer in an amount of from 0.1 to 8% by weight based on the weight of the ferromagnetic powder.

5. A magnetic recording medium as in claim 1, wherein said hydroxylaluminum salt represented by formula (I) is top-coated onto the surface of the magnetic layer in an amount of from 2 to 50 mg/m² of the magnetic recording medium.

6. A magnetic recording medium as in claim 1, wherein said magnetic layer further contains a lubricant other than said hydroxylaluminum salt represented by formula (I) in an amount of from 1/10 to 2 times by weight of the compound of formula (I).

7. A magnetic recording medium as in claim 1, wherein said binder has a glass transition temperature ($T_g$) of from $-40°$ C. to $150°$ C. and a weight average molecular weight of from 10,000 to 300,000.

8. A magnetic recording medium as in claim 2, wherein said resin contains said at least one polar group in an amount of from $10^{-7}$ to $10^{-3}$ equivalent per gram of the resin.

9. A magnetic recording medium as in claim 2, wherein said polar group-containing resin is contained in the magnetic layer in an amount of at least 5% by weight of the whole binder.

10. A magnetic recording medium as in claim 1, wherein said binder is contained in the magnetic layer in an amount of 10 to 40% by weight based on the weight of the ferromagnetic powder.

11. A magnetic recording medium as in claim 1, wherein said magnetic layer further contains inorganic particles having a Mohs' hardness of at least 5 in an amount of from 0.1 to 20 parts by weight per 100 parts weight of the ferromagnetic powder.

12. A magnetic recording medium as in claim 1, further comprising an intermediate layer arranged between the non-magnetic support and the magnetic layer, said intermediate layer comprising a binder and carbon particles having a particle diameter of from 10 to 50 nm.

13. A magnetic recording medium as in claim 12, wherein said intermediate layer has a thickness of from 0.5 to 4 μm.

14. A magnetic recording medium as in claim 1, wherein said magnetic layer has a dry thickness of from 0.5 to 10 μm.

15. A magnetic recording medium comprising a non-magnetic support having a ferromagnetic metal thin film magnetic layer provided thereon, wherein a higher fatty acid hydroxylaluminum salt represented by formula (I) is top-coated onto the surface of the ferromagnetic thin film in an amount of from 2 to 30 mg/m² of the magnetic recording medium:

$$(R^1COO)_nAl(OH)_{3-n} \qquad (I)$$

wherein $R^1$ is a hydrocarbon group having from 10 to 26 carbon atoms, and n is an integer of 1 or 2.

16. A magnetic recording medium as in claim 15, wherein said magnetic layer comprises a laminated ferromagnetic metal thin film having a total thickness of from about 0.2 to 5.0 μm.

* * * * *